United States Patent
Richards et al.

(10) Patent No.: US 7,417,008 B2
(45) Date of Patent: Aug. 26, 2008

(54) SUPPORTED POLYOXOMETALATES AND PROCESS FOR THEIR PREPARATION

(75) Inventors: Ryan M. Richards, Bremen (DE); Ulrich Kortz, Bremen (DE); Lihua Bi, Changchua (CN); Kake Zhu, Shanghai (CN)

(73) Assignee: ExxonMobil Chemical Patents Inc., Houston, TX (US)

( * ) Notice: Subject to any disclaimer, the term of this patent is extended or adjusted under 35 U.S.C. 154(b) by 135 days.

(21) Appl. No.: 11/443,683

(22) Filed: May 31, 2006

(65) Prior Publication Data

US 2007/0282138 A1 Dec. 6, 2007

(51) Int. Cl.
*B01J 23/00* (2006.01)
*C01G 41/02* (2006.01)
*C07C 45/00* (2006.01)
*C07C 27/00* (2006.01)

(52) U.S. Cl. ............... 502/306; 502/311; 502/313; 423/593.1; 423/594.13; 568/399; 568/956; 568/959

(58) Field of Classification Search .............. 423/593.1, 423/594.13; 502/306, 311, 313; 568/399, 568/956, 959
See application file for complete search history.

(56) References Cited

U.S. PATENT DOCUMENTS

| | | | |
|---|---|---|---|
| 5,091,354 A | 2/1992 | Ellis, Jr. et al. | |
| 6,114,274 A | 9/2000 | Bordes et al. | 502/209 |
| 2003/0171604 A1 | 9/2003 | Mizuno et al. | 549/533 |
| 2006/0142620 A1 | 6/2006 | Deshpande et al. | 568/959 |

FOREIGN PATENT DOCUMENTS

WO    98/54165    12/1998

OTHER PUBLICATIONS

U.S. Appl. No. 11/445,073, filed May 31, 2006, Kortz et al.
U.S. Appl. No. 11/445,095, filed May 31, 2006, Kortz et al.
Bösing et al., "Highly Efficient Catalysts in Directed oxygen-Transfer Processes: Synthesis, Structure of Novel Manganese-Containing Heteropolyanions, and Applications in Regioselective Epoxidation of Dienese with Hydrogen Peroxide," Journal of American Chemical Society, American Chemical Society, vol. 120, No. 29, 1998, pp. 7252-7259.
Cavani, F., "Heteropolycompound-based catalysts: A blend of acid and oxidizing properties," Catalysis Today 41 (1998) 73-86.
Kortz, et al., "Synthesis and Characterization of Iron(III)-Substituted, Dimeric Polyoxotungstates, [Fe4(H2O)10($\beta$-XW9O33)2]n–(n=6, X=As$^{III}$, Sb$^{III}$; n=4, X=SeIV, TeIV)," Aug. 6, 2001, Inorg. Chem. 2002, 41, 783-789.
Krebs et al., "Heteropolymetalate Clusters of the Subvalent Main Group Elements Bi$^{III}$ and SB$^{III}$," Nov. 19, 1998; Inorg. Chem. 1999, 38, 2688-2694.
Krebs et al., "New Strategies for the Generation of Large Heteropolymetalate Clusters: The $\beta$-B-SbW9 Fragment as a Multifunctional Unit," Chem. Eur. J. 1997, 3, No. 8, 123.
Kuznetsova et al., "O$_2$/H$_2$ Oxidation of Hydrocarbons on the Catalysts Prepared from Pd(III) Complexes with Heteropolytungstates," Studies in Surface Science and Catalysts, Elsevier Science B.V., Amsterdam, NL, vol. 110, 1997, 1203-1211.
Misono et al., "Recent progress in catalytic technology in Japan," Applied Catalysis, vol. 64 (1-2), Sep. 1990, 1-30.
Misono, M., "Unique acid catalysis of heteropoly compounds (heteropolyoxometalates) in the solid state," Chem. Comm., 2001, 1141-1152.
Neumann R., "Polyoxometalate complexes in organic oxidation chemistry," Progress in Inorganic Chemistry (1998), vol. 47, 317-370.
N. Mizuno et al., "Heterogeneous Catalysis," Chem . . . Rev., vol. 98, 1998, pp. 199-217.

*Primary Examiner*—P. Nazario Gonzalez

(57) ABSTRACT

The invention relates to supported polyoxometalates represented by the formula $(A_n)^{m+}$ [M$_4$(H$_2$O)$_{10}$(XW$_9$O$_{33}$)$_2$]$^{m-}$ or solvates thereof, wherein A represents a cation, n is the number of cations, m is the charge of the polyoxoanion, M is a transition metal, and X is an element selected from the group consisting of As, Sb, Bi, Se and Te, characterized in that the polyoxometalate is supported on a solid support selected from the group consisting of Al$_2$O$_3$, MgO, TiO$_2$, ZrO$_2$, SiO$_2$, mesoporous silica, active carbon, diatomite, clays, zeolites, polyoxometalate salts and mixtures thereof, with the proviso that the polyoxometalate salt supports are different from the supported polyoxometalates defined by the above formula, a process for their preparation and their use for the catalytic oxidation of organic molecules.

33 Claims, No Drawings

SUPPORTED POLYOXOMETALATES AND PROCESS FOR THEIR PREPARATION

FIELD OF THE INVENTION

This invention is directed to supported polyoxymetalates, a process for their preparation and their use for the catalytic oxidation of organic molecules.

BACKGROUND OF THE INVENTION

Polyoxometalates (POMs) are a unique class of molecular metal-oxygen clusters. They consist of a polyhedral cage structure or framework bearing a negative charge and centrally located heteroatom(s) surrounded by the cage framework. The negative charge is balanced by cations that are external to the cage. Generally, suitable heteroatoms include Group IIIa-VIa elements such as phosphorus, antimony, silicon, selenium and boron. The framework of polyoxometalates is usually comprised of edge- or corner-shared $MO_6$ octahedra, where M represents a transition metal (addenda). Due to appropriate cation radius and good $\pi$-electron acceptor properties, the addenda metal is substantially limited to a few metals including Group Vb or VIb transition metals in their highest oxidation state (e.g. $V^{5+}$, $Nb^{5+}$, $Ta^{5+}$, $W^{6+}$, $Mo^{6+}$).

A major subclass of polyoxometalates is constituted by Keggin type POMs. These polyoxoanions generally consists of 12 framework metals and 40 oxygen atoms symmetrically arranged around a central atom X and thus can be represented by the formula $X^nM_{12}O_{40}^{(8-n)-}$. If the central atom X is a heteroatom with a lone pair of electrons (e.g. $As^{III}$, $Sb^{III}$), the formation of such closed Keggin units is not allowed. In fact, most of these POMs consist of dimeric adducts of incomplete (lacunary) Keggin fragments joined together by extra framework or heteroatoms.

For example, Krebs et al. (Chem. Eur. J. 1997, 3, 1232; Inorg. Chem. 1999, 38, 2688) describe the dimeric structural type $[(WO_2)_4(OH)_2(\beta\text{-}XW_9O_{33})_2]^{12-}$ ($X=Sb^{III}$, $B^{III}$). Moreover, the authors were also able to substitute the two external tungsten atoms by first-row transition metals resulting in transition metal substituted polyoxometalates (TMSPs) represented by the formula $[(WO_2)_2M_2(H_2O)_6(\beta\text{-}XW_9O_{33})_2]^{(14-2n)-}$ ($X=Sb^{III}$, $M^{n+}=Mn^{2+}$, $Fe^{3+}$, $Co^{2+}$, $Ni^{2+}$; $X=Bi^{III}$, $M^{n+}=Fe^{3+}$, $Co^{2+}$, $Ni^{2+}$, $Cu^{2+}$, $Zn^{2+}$).

Moreover, Kortz et al. report on tetrasubstituted dimeric polyoxotungstates which consist of two $[\beta\text{-}XW_9O_{33}]^{n-}$ (n=9, $X=As^{III}$, $Sb^{III}$; n=8, $X=Se^{IV}$, $Te^{IV}$) moieties linked by four $Fe^{3+}$ ions having terminal $H_2O$ ligands (Inorg. Chem. 2002, 41, 783). These authors were also able to substitute the iron centers in this structure by a large number of other $1^{st}$, $2^{nd}$ and $3^{rd}$ row transition metals (e.g. $Mn^{2+}$, $Co^{2+}$, $Ni^{2+}$, $Cd^{2+}$, $Hg^{2+}$).

Due to their size, shape, charge density and redox-active nature, POMs and in particular TMSPs have attracted continuously growing attention in the area of oxidation catalysis.

Several oxidation reactions of organic substrates using polyoxometalates are known. For instance, Neumann et al. describe the oxidation of alkenes and cycloalkanes using a ruthenium-substituted sandwich type polyoxometalate and hydrogen peroxide or molecular oxygen as an oxygen donor (Angew. Chem. Int. Ed. Engl. 1995, 34, 1587; Inorg. Chem. 1995, 34, 5753; and J. Am. Chem. Soc. 1998, 120, 11969). In addition, they report on the epoxidation of chiral allylic alcohols (J. Org. Chem. 2003, 68, 1721-1728). Cavani et al. disclose the oxidation of isobutane to methacrylic acid (Topics in Catalysis 2003, 23, 141-152) and Kamat et al. describe the epoxidation of various olefins using hydrogen peroxide and a silicotungstate compound (Science 2003, 300, 964-966). Further, WO 03/028881 discloses a process for the selective oxidative dehydrogenation of alkanes to produce olefins using certain polyoxometalate catalysts.

Additional references of interest include: Pope et al., JACS 1992, 114, 2932-2938; Finke et al., Inorg. Chem. 2005; Li et al., Chinese J. Chem. 2004, 22(8), 874-876; Sousa et al., Chem. Comm. 2004, 23, 2656-2657; Haber et al., Applied Catal. A2003, 256(1-2), 141-152; Cavani et al., Topics in Catalysis 2003, 23(1-4), 119-124; Hill et al., JACS 2003, 125(11), 3194-3195; Krebs et al., Polyoxometallate Chemistry 2001, 89-99; Burns et al., J. Mol. Catal. A2002, 184(1-2), 451-464, Ratiu et al., Polyhedron 2002, 21(4), 353-358; Cavani et al., Catal. Letters 2001, 71(1-2), 99-105; Villanneau et al., JCS Dalton Trans. Inorg. Chem. 1999, 3, 421-426; Server-Carrio et al., JACS 1999, 121(5), 977-984; Katsoulis et al., EP95-308486, 19951127 (Dow Corning Corp.); Yonehara et al., JP 2003-349996, 20031008 (Nippon Shokubai Co.); U.S. 2004/0210086; U.S. Pat. No. 6,809,219; U.S. Pat. No. 6,743,748; U.S. Pat. No. 6,710,207; U.S. Pat. No. 6,664,408; U.S. Pat. No. 6,610,864; U.S. 2003/0187297; U.S. 2003/0171604; U.S. 2003/0144550; U.S. 2003/0109740; U.S. 2003/0036473; U.S. 2003/0017561; U.S. Pat. No. 6,518,216; U.S. 2002/0165405; U.S. 2002/0142914; U.S. Pat. No. 6,455,735; U.S. 2002/0091275; U.S. Pat. No. 6,387,841; U.S. Pat. No. 6,169,202; U.S. Pat. No. 6,114,274; U.S. Pat. No. 6,060,419; U.S. Pat. No. 6,043,184; U.S. Pat. No. 6,022,986; U.S. Pat. No. 5,990,348; U.S. Pat. No. 5,928,382; U.S. Pat. No. 5,714,429; U.S. Pat. No. 5,705,685; U.S. Pat. No. 5,684,216; U.S. Pat. No. 5,629,459; U.S. Pat. No. 5,616,815; U.S. Pat. No. 4,634,502; EP 1080784; EP 1213280; EP1205474; EP1380340; EP0966323; EP1205474; EP1201636; EP1080784; EP1078687; EP1077082; EP0771781; EP1059276; EP0704240; EP0955284; EP0771781; EP0713847; EP0713723; EP0704240; EP0683153; WO2005/023747; WO2003/039745; WO2000/009262 and DE10055173.

However, with respect to the catalytic performance of polyoxometalates in oxidation reactions and in particular in the selective oxidation of alkanes no satisfactory results have been reported up to now.

Therefore, it is the object of the present invention to provide polyoxometalates showing an improved catalytic performance in oxidation reactions of organic substrates and in particular attaining high conversions when used for the selective oxidation of alkanes.

SUMMARY OF THE INVENTION

This invention relates to supported polyoxometalates represented by the formula $$(A_n)^{m+}[M_4(H_2O)_{10}(XW_9O_{33})_2]^{m-}$$

or solvates thereof, wherein

A represents a cation, n is the number of cations, m is the charge of the polyoxoanion, M is a transition metal, and X is an element selected from the group consisting of As, Sb, Bi, Se and Te.

wherein that the polyoxometalate is supported on a solid support selected from the group consisting of $Al_2O_3$, MgO, $TiO_2$, $ZrO_2$, $SiO_2$, mesoporous silica, active carbon, diatomite, clays, zeolites, polyoxometalate salts and mixtures thereof, with the proviso that the polyoxometalate salt supports are different from the supported polyoxometalates defined by the above formula.

DETAILED DESCRIPTION OF THE INVENTION

The CAS numbering scheme for the Periodic Table Groups is used as published in CHEMICAL AND ENGINEERING NEWS, 63(5), 27 (1985).

The object described above is achieved by supported polyoxometalates represented by the formula $$(A_n)^{m+}[M_4(H_2O)_{10}(XW_9O_{33})_2]^{m-}$$

or solvates thereof, wherein
A represents a cation,
n is the number of cations,
m is the charge of the polyoxoanion,
M is a transition metal, and
X is an element selected from the group consisting of As, Sb, Bi, Se and Te,
characterized in that the polyoxometalate is supported on a solid support selected from the group consisting of $Al_2O_3$, MgO, $TiO_2$, $ZrO_2$, $SiO_2$, mesoporous silica, active carbon, diatomite, clays, zeolites, polyoxometalate salts and mixtures thereof, with the proviso that the polyoxometalate salt supports are different from the supported polyoxometalates defined by the above formula.

The polyoxometalates according to the invention can be prepared according to the method disclosed in Kortz et al., Inorg. Chem. 2002, 41, 783, and have been found to exist as a dimeric assembly, i.e. four octahedral transition metal centers hold together two trilacunary (B-β-$XW_9O_{33}$) Keggin fragments.

The invention also includes solvates of the present POMs. A solvate is an association of solvent molecules with a polyoxometalate. Preferably, water is associated with the POMs, as the POMs are usually synthesized in water. However, this water can be gradually removed by heating the solid POMs.

The cation A can be a Group Ia, IIa, IIIb, IVb, Vb, VIb, VIIb, VIIIb, Ib, IIb, IIIa, IVa, Va or VIa metal or an organic cation. Preferably, A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium such as tetraalkylphosphonium, ammonium, guanidinium, tetraalkylammonium, protonated aliphatic amines, protonated aromatic amines and combinations thereof. More preferably, A is selected from sodium, potassium, cesium and combinations thereof.

The number n of cations is dependent on the nature of cation(s) A, namely its/their valence, and the negative charge m of the polyanion which preferably has to be balanced. Typically, the overall charge of all cations A is equal to the charge of the polyanion. In turn, the charge m of the polyanion is dependent on the oxidation states of the metal M and the heteroatom X. m depends on the oxidation state of the atoms present in the polyanion, e.g., it follows from the oxidation states of W (+6), O (−2), a given heteroatom X (such as +3 for Sb, Bi and As or +4 for Se and Te), and the transition metal, M (ranging from +2 to +5). In some embodiments, m is 2 or 4 or 6 or 8 or 10. In some embodiments, n is 1, 2, 3, 4, 5, 6, 7, 8, 9, or 10.

The metal M of the polyoxometalates according to the invention is selected from the entire block of transition metals of the Periodic Table of the Elements. Preferably, M is selected from the group consisting of first row transition metals (e.g. Fe, Cr, Mn, Co, Ni, Cu, Zn), Cd, Hg and combinations thereof. The oxidation state of M comprised in the present polyoxometalates can range from +II to +V and preferably is +III for Fe and Cr and +II for all other incorporated transition metals.

The heteroatom X is selected from the group consisting of As, Sb, Bi, Se and Te.

Specific embodiments of polyoxometalates according to the above formula are given in the examples.

The polyoxometalates of the invention are further characterized in that they are supported on a solid support. Generally, porous supports having high surface areas which have been described in the prior art for supporting heteropolyacids used in acid-catalyzed reactions, are also useful in this invention (see: Haber et al., Applied Catalysis A 2003, 256, 141-152; Kozhevnikov et al., Catalysis Letters 1995, 30, 241-252; Kozhevnikov et al., Journal of Molecular Catalysis A 1996, 114, 287-298; Wu et al., Ind. Eng. Chem. Res. 1996, 35, 2546). The solid support is selected from the group consisting of $Al_2O_3$, MgO, $TiO_2$, $ZrO_2$, $SiO_2$, mesoporous silica, active carbon, diatomite, clays including layered aluminosilicates (e.g. bentonite), zeolites such as mesoporous zeolite crystallites described in A. Boisen et al., Chem. Commun. 2003, 8, 958-959 and Y. Tao et al., Langmuir 2005, 21, 2, 504-507, and polyoxometalate salts. Preferably, the support is selected from the group consisting of $Al_2O_3$, MgO, $ZrO_2$, $SiO_2$ and mesoporous silica which can be defined as silica having a pore size between 2 and 50 nm. Examples of mesoporous silica are SBA-15, MCM-41, and MCM-48. In particular, SBA-15 is used as mesoporous silica which can be prepared according to Zhao et al., Science 279, 1998, 548. Further, if a metal oxide such as MgO or $Al_2O_3$ is used as support, it is preferred that this material is in the form of an aerogel, i.e. a material having a relatively low density and high porosity as a consequence of the method of preparation. The metal oxide aerogels can be characterized by a BET surface of 50 to 1000 $m^2/g$, a pore volume of 0.1 to 2.0 $cm^3/g$ and/or a pore size of 0.5 to 20 nm each determined by nitrogen physisorption analysis.

If a polyoxometalate salt is used as solid support, this polyoxometalate salt is different from the supported polyoxometalate according to the invention and is not represented by the above formula $(A_n)^{m+}[M_4(H_2O)_{10}(XW_9O_{33})_2]^{m-}$. Suitable polyoxometalate salt supports are known from the prior art, e.g. EP 1 078 687, EP 1 059 276, U.S. Pat. No. 6,043,184 and WO 00/09262, and are preferably wide pore salts having the formula $$(C_aH_{(e-az)})^{e+}(X'_kM'_{p-x}M^1_xM^2_qO_y)^{e-},$$

wherein C is a cation selected from potassium, rubidium, cesium, magnesium, calcium, strontium, barium, transition metal, actinide metal, lanthanide metal, metal oxy ion, ammonium, tetraalkylammonium, pyridinium, quinolinium, protonated aromatic amines, protonated aliphatic amines or mixtures thereof; X' is an element selected from Groups 3-16 elements; M' is molybdenum, tungsten or a combination thereof; $M^1$ is vanadium; $M^2$ is a transition metal different from M' and $M^1$ such as zinc; a is the number of cations, z is the charge of C (typically 1, 2, 3, 4, 5 or 6); k is from 1 to 5; p is from 5 to 20; q is from 0 to 3; x is from 0 to 6; y is from 18 to 62; and e is the charge of the polyanion. Examples of suitable polyoxometalate salt supports include $Cs_3(PMo_{12}O_{40})$, $Cs_4(PMo_{11}VO_{40})$, $Cs_5(PMo_{10}V_2O_{40})$, $Cs_6(PMo_9V_3O_{40})$, $Cs_3(PW_{12}O_{40})$, $Cs_4(PW_{11}VO_{40})$, $Cs_5(PW_{10}V_2O_{40})$ and $Cs_6(PW_9V_3O_{40})$.

If a support containing hydroxy groups on its surface such as $SiO_2$ or SBA-15 is used, then it is preferred to support the polyoxometalate on a surface which has been modified with an amine compound of formula

wherein $R^1$ is alkyl, preferably $C_1$-$C_4$ alkyl, (preferably methyl, ethyl, propyl or butyl and all isomers thereof)

Y is carbon or silicon, preferably silicon (in this instance Y is NOT yttrium)

x is 0, 1, 2, 3, 4, 5, 6, 7, 8, 9, 10, 11 or 12, preferably 1, 2, 3, 4, 5 or 6, and $R^2$ is hydrogen, alkyl or aryl, preferably hydrogen.

In particular, a preferred amine compound used is aminopropyltriethoxysilane(APTS).

Such a modification causes the hydroxy groups on the surface of the support to react with the alkoxy group of the amine compound resulting in the formation of support-oxygen-amine compound-bonds and thus in the immobilization of the amine compound on the support. Therefore, after acidification ammonium cations covalently bound to the support are obtained which can electrostatically interact with the polyanions of the POMs to be supported.

The present invention is further directed to a process for preparing polyoxometalates according to the invention comprising (a) mixing the solid support with a solution of $(A_n)^{m+}[M_4(H_2O)_{10}(XW_9O_{33})_2]^{m-}$ (where A, n, m, M, and X are as defined above), (b) stirring and optionally heating the mixture of step (a), (c) optionally filtering the mixture of step (b), and (d) recovering the supported polyoxometalate.

In step (a), the solid support is mixed with a solution of the polyoxometalate. The solvent used for this solution is preferably selected from the group consisting of water, acetonitrile, acetone, dimethylformamide, 1,4-dioxane, 1,2-dichloroethane and mixtures thereof. It is particularly preferred to dissolve the polyoxometalate in water. However, in case cation A is tetraalkylammonium, the solvent used is preferably less polar than water. In general, the longer the alkyl chain, the less polar the solvent should be. For example, if cation A is tetrabutylammonium, acetonitrile is preferably used as solvent.

In step (b), the mixture of step (a) is stirred. Preferably, the mixture is stirred for 1 minute to 10 hours, preferably from 5 to 10 h. Additionally, during stirring the mixture can be heated to a temperature of 50 to 100° C. depending on the thermal stability of the polyoxometalate, preferably about 70 to 90° C., preferably about 75 to 85° C., preferably of about 80° C.

Optionally, the mixture of step (b) can be filtered in step (c), before the supported polyoxometalate is recovered in step (d). In case a filtration has actually taken place in step (c), the product is recovered by washing and drying the filtered solid of step (c). If the reaction mixture has not been filtered, then the supported POM is typically recovered by evaporating the solvent of mixture (b) and drying the obtained solid. Usually, the drying of step (d) can be performed using techniques known in the art and is preferably carried out at a temperature of 30 to 100° C. under ambient or reduced pressure.

In one embodiment of the invention, the polyoxometalate is supported on aerogels of MgO or $Al_2O_3$ by mixing the aerogel with a water solution of the POM, stirring the mixture at a temperature of 50 to 100° C., preferably about 70 to 90° C., preferably about 75 to 85° C., preferably of about 80° C. and drying the mixture.

For supporting POMs on modified $SiO_2$ or SBA-15 such as APTS-modified $SiO_2$ or SBA-15, a mixture of the support and a POM solution in water is stirred for 1 minute to 10 hours, preferably 5 to 10 h and filtered. Then, the filtered solid is washed with water and dried at temperature of 50 to 100° C., preferably 75 to 100° C., preferably of about 95° C.

In addition, the polyoxometalate can be supported by incipient wetness impregnation techniques. In this method, the pore volume of the support is determined first and then the POM is dissolved in the same volume (or from 75% of the volume to 500% of the volume, preferably from 100% to 400% of the volume, preferably from 200 to 300% of the volume) of a solvent such as water, acetonitrile and ethanol to form a solution. Afterwards the support is impregnated with this solution and the mixture is dried.

It has been found that the supported POMs according to the invention typically have POM loading levels on the support of up to 40 wt. % or even more. Accordingly, POM loading levels on the support of 1 to 40 wt. %, particularly 5 to 30 wt. %, and more particularly 5 to 20 wt. % are in general suitable. POM loading levels can be determined by Inductively Coupled Plasma Mass Spectrometry (ICP) analysis or X-ray photoelectron spectroscopy (XPS) as described in the Examples section. In the event the values from the ICP and XPS differ, the ICP shall control.

The present invention is also directed to the use of polyoxometalates according to the invention as catalyst for the oxidation of organic substrates.

In a further aspect, the invention also includes a process for oxidizing organic substrates, wherein a supported polyoxometalate or a mixture of two or more supported polyoxometalates according to the invention is contacted with an organic substrate in the presence of a suitable oxidizing agent.

The use of the polyoxometalates according to the invention for catalyzing oxidation reactions of organic substrates as well as the process according to the invention for oxidizing organic substrates can be further characterized by the following features.

The organic substrate can be selected from the group consisting of saturated and unsaturated hydrocarbons and unsubstituted and substituted aromatic hydrocarbons and mixtures thereof. Advantageously, branched or unbranched alkanes and alkenes having carbon numbers from C1 to C20, preferably from C1 to C6, as well as cycloalkanes, e.g. cyclohexane and adamantane, or combinations thereof are used as organic substrate. Examples of suitable organic substrates are methane, ethane, propane, butane, isobutane, pentane, isopentane, neopentane, hexane, ethylene, propylene, α-butylene, cis-β-butylene, trans-β-butylene, isobutylene, n-pentylene, isopentylene, cyclohexane, adamantane, cyclooctadiene, benzene, toluene, o-xylene, m-xylene, p-xylene, mesitylene, durene, hexamethylbenzene, naphthalene, anthracene, phenantrene and mixtures thereof.

Commonly, suitable oxygen donors such as molecular oxygen, peroxides (e.g. $H_2O_2$, t-$(C_4H_9)OOH$) or peracids (e.g. $CH_3COOOH$) can be used as oxidizing agent. Preferably, the oxidizing agent is an oxygen containing atmosphere. In particular, the oxygen containing atmosphere is air and is constantly passed through the hydrocarbon (such as an alkane or alkene) at a pressure of 0.01 to 100 bar, preferably 10 to 70 bar.

Moreover, the oxidation of the organic substrate is preferably carried out at a temperature of 30 to 600° C., preferably 75 to 250° C., preferably 130 to 180° C.

It has been found that supporting of the present dimeric POMs on a solid support yields heterogeneous catalysts for selectively oxidizing organic substrates. Generally, a number of reaction products such as ethers, esters, alcohols, ketones, aldehydes, epoxides, lactones, paraffins and acids can be obtained in certain selectivities and high conversions of the organic substrate using the supported POMs of the present invention. In particular, it has been found that the catalysts are mainly selective to internal ketones if an unbranched-chain alkane is used as feed material. Thus, the present use as well as the present process are particularly suitable for the selective oxidation of alkanes and especially for synthesizing ketones. Preferably, more than 10 % by weight (more preferably more than 15 wt %, more preferably more than 20 wt %) of the alkane feed material is converted into ketones and in particular into the ketone corresponding to the employed alkane.

Moreover, the present supported catalysts have turned out to show an increased activity compared to the corresponding non-supported polyoxometalates. Depending on the polyoxometalate and support used, the conversion of the alkane feed is typically increased by a factor of at least 2, preferably of at least 5, and more preferably of at least 10.

Due to their definite stoichiometry, the present supported polyoxometalates can be converted (e.g. by calcination) to mixed metal oxide catalysts in a highly reproducible manner. Consequently, the polyoxometalates according to the invention can also be used as a precursor for mixed metal oxide catalysts such as so-called Mitsubishi-type catalysts which are particularly useful for the oxidation of hydrocarbons such as propane.

The invention is further illustrated by the following examples.

This invention further relates to:

1. Supported polyoxometalates represented by the formula:

$$(A_n)^{m+} [M_4(H_2O)_{10}(XW_9O_{33})_2]^{m-}$$

or solvates thereof, wherein
   A represents a cation,
   n is the number of cations,
   m is the charge of the polyoxoanion,
   M is a transition metal, and
   X is an element selected from the group consisting of As, Sb, Bi, Se and Te,
   wherein that the polyoxometalate is supported on a solid support selected from the group consisting of $Al_2O_3$, MgO, $TiO_2$, $ZrO_2$, $SiO_2$, mesoporous silica, active carbon, diatomite, clays, zeolites, polyoxometalate salts and mixtures thereof, with the proviso that the polyoxometalate salt supports are different from the supported polyoxometalates defined by the above formula.

2. Polyoxometalates according to paragraph 1, wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof.

3. Polyoxometalates according to paragraphs 1 or 2, wherein M is selected from Fe, Cr, Mn, Co, Ni, Cu, Zn, Cd and Hg, preferably Fe, Cr and Co.

4. Polyoxometalates according to any one of paragraphs 1 to 3, wherein the mesoporous silica is SBA-15, MCM-41 or MCM-48.

5. Polyoxometalates according to any one of paragraphs 1 to 4, wherein the solid support is $SiO_2$ or mesoporous silica, in particular SBA-15, having a surface modified with an amine compound of formula $$(R^1O)_3Y(CH_2)_xNR^2_2,$$

wherein
   $R^1$ is alkyl, preferably $C_1$-$C_4$ alkyl,
   Y is carbon or silicon, preferably silicon
   x is an integer from 0 to 12, preferably 1 to 6, and
   $R^2$ is hydrogen, alkyl or aryl, preferably hydrogen.

6. Polyoxometalates according to paragraph 5, wherein the amine compound is aminopropyltriethoxysilane.

7. Process for the preparation of polyoxometalates according to any one of paragraphs 1 to 6 comprising
   (a) mixing the solid support with a solution of $(A_n)^{m+}$ $[M_4(H_2O)_{10}(XW_9O_{33})_2]^{m-}$,
   (b) stirring and optionally heating the mixture of step (a),
   (c) optionally filtering the mixture of step (b), and
   (d) recovering the supported polyoxometalate.

8. Process according to paragraph 7, wherein the solvent used for the solution in step (a) is selected from the group consisting of water, acetonitrile, acetone, dimethylformamide, 1,4-dioxane, 1,2-dichloroethane and combinations thereof.

9. Process according to paragraph 7 or 8, wherein in step (b) the mixture is heated to a temperature of 50 to 100° C., preferably of about 80° C.

10. Process according to any one of paragraphs 7 to 9, wherein in step (d) the supported polyoxometalate is recovered by evaporating the solvent of the mixture of step (b) or washing and drying the filtered solid of step (c).

11. Use of supported polyoxometalates according to any one of paragraphs 1 to 6 or prepared according to any one of paragraphs 7 to 10 as catalyst for the oxidation of organic substrates, preferably the selective oxidation of alkanes.

12. Process for oxidizing organic substrates comprising contacting supported polyoxometalates according to any one of paragraphs 1 to 6 or prepared according to any one of paragraphs 7 to 10 with an organic substrate in the presence of an oxidizing agent.

13. Use of supported polyoxometalates according to any one of paragraphs 1 to 6 or prepared according to any one of paragraphs 7 to 10 as a precursor for preparing mixed metal oxide catalysts.

14. Use according to paragraph 13, wherein the mixed metal oxide catalysts are Mitsubishi-type catalysts.

EXAMPLES

Preparation of Polyoxometalates

The POMs used in the following examples were prepared according to Kortz et al., Inorg. Chem. 2002, 41, 783.

Example 1

Synthesis of $[Fe_4(H_2O)_{10}(XW_9O_{33})_2]^{6-}$ (X=As and Sb)

0.97 g of $FeCl_3 \cdot 6H_2O$ was dissolved in 40 mL of water. 4.0 g of $Na_9[\alpha\text{-}AsW_9O_{33}]$ was added. The pH of the solution was adjusted to 3.0 by addition of 4M HCl. Then the solution was heated to 90° C. for 1 h. After cooling to room temperature 4.0 g solid CsCl was added. This resulted in 4.1 g of $Cs_5Na[Fe_4(H_2O)_{10}(AsW_9O_{33})_2] \cdot nH_2O$ (n=5-20, yield ~87%). $Cs_5Na[Fe_4(H_2O)_{10}(SbW_9O_{33})_2] \cdot nH_2O$ (n=5-20) was obtained in similar yields when using 4.0 g of $Na_9[\alpha\text{-}SbW_9O_{33}]$ instead of $Na_9[\alpha\text{-}AsW_9O_{33}]$.

For the synthesis of the corresponding Cr derivative, Example 1 was repeated except that 0.96 g of $CrCl_3 \cdot 6H_2O$ was used instead of $FeCl_3 \cdot 6H_2O$.

Example 2

Synthesis of $[Fe_4(H_2O)_{10}(XW_9O_{33})_2]^{4-}$ (X=Se and Te)

4.4 g of $Na_2WO_4 \cdot 2H_2O$ was dissolved in 40 mL of $H_2O$ and heated to about 50° C. 0.82 g of $FeCl_3 \cdot 6H_2O$ and 0.17 g of $H_2SeO_3$ were added. The pH of the solution was adjusted to 1.0 by addition of 4M HCl. Then the solution was heated to 90° C. for 1 h. After cooling to room temperature 4.0 g solid CsCl was added. This resulted in 4.1 g of $Cs_4[Fe_4(H_2O)_{10}(SeW_9O_{33})_2] \cdot nH_2O$ (n=2-10, yield ~57%). $Cs_4[Fe_4(H_2O)_{10}(TeW_9O_{33})_2] \cdot nH_2O$ (n=2-10) was obtained in similar yields when instead of 0.17 g of $H_2SeO_3$ 0.41 g of $K_2TeO_3$ was used.

For the synthesis of the corresponding Cr, Mn, Co, Ni, Zn, Cd and Hg derivatives, Example 2 was repeated except that appropriate amounts of the respective metal salts were used instead of $FeCl_3 \cdot 6H_2O$ (see Kortz et al., Inorg. Chem. 2002, 41, 783). For example, 0.80 g of $CrCl_3 \cdot 6H_2O$ and 0.71 g of $CoCl_2 \cdot 6H_2O$, respectively, were used.

The following species were prepared using the above procedures:

$Cs_5Na[Fe_4(H_2O)_{10}(AsW_9O_{33})_2]$ (As2W18Fe4)
$Cs_5Na[Fe_4(H_2O)_{10}(SbW_9O_{33})_2]$ (Sb2W18Fe4)
$Cs_4[Fe_4(H_2O)_{10}(SeW_9O_{33})_2]$ (Se2W18Fe4)
$Cs_4[Fe_4(H_2O)_{10}(TeW_9O_{33})_2]$ (Te2W18Fe4)
$Cs_5Na[Cr_4(H_2O)_{10}(AsW_9O_{33})_2]$ (As2W18Cr4)
$Cs_5Na[Cr_4(H_2O)_{10}(SbW_9O_{33})_2]$ (Sb2W18Cr4)
$Cs_4[Cr_4(H_2O)_{10}(SeW_9O_{33})_2]$ (Se2W18Cr4)
$Cs_8[Co_4(H_2O)_{10}(SeW_9O_{33})_2]$ (Se2W18Co4)
$Cs_8[Co_4(H_2O)_{10}(TeW_9O_{33})_2]$ (Te2W18Co4)

Preparation of Supports

Example 3

Preparation of $Al_2O_3$ Aerogel 0.0147 mol of aluminum triisopropoxide was dissolved in 130 mL of 2-propanol and 170 mL of toluene. 0.0444 mol of water was added while stirring. After further stirring for 14 h, the reaction mixture was heated in an autoclave to a temperature of 265° C. and a pressure of 60-100 bar (supercritical conditions). After releasing the pressure, the solid was calcined at 500° C. for 4 h to give $Al_2O_3$ aerogel.

Example 4

Preparation of MgO Aerogel 2.4 g of Mg ribbon was cut into small pieces and stirred with 100 mL of methanol under an argon atmosphere to form a clear solution of $Mg(OCH_3)_2$ containing 10 wt. % Mg. This solution was diluted with 300 mL of toluene and then 4 mL of water mixed with methanol (between 5-20 mL) was added slowly over 30 min. The obtained clear gel was transferred to an autoclave and dried at supercritical conditions (T=265° C., p=100-120 bar). The powder collected after pressure release was calcined at 500° C. for 4 h to give MgO aerogel.

Example 5

Preparation of Mesoporous Silica SBA-15

SBA-15 was synthesized in acidic conditions using the tri-block copolymer, poly(ethylene oxide)-poly(propylene oxide)-poly(ethylene oxide) (EO20PO70EO20) (BASF), as template and tetraethyl orthosilicate (TEOS) as a silicon source. 37.5 mL of a solution of EO20PO70EO20:2M HCl: TEOS:H2O=2:60:4.25:15 (molar ratio) was prepared, stirred for 4 h at 40° C., and then heated at 95° C. for 3 days. The solid products were filtered and calcined at 550° C. for 4 h to give 0.6 g of SBA-15.

The supports prepared according to Examples 3 to 5 have been characterized by XRD, nitrogen adsorption-desorption and TEM analysis. XRD analysis was conducted using a Siemens Diffractometer D5000 with Cu K$\alpha$ ($\lambda$=0.15406 nm, 40 kV, 40 mA) radiation, at a scanning speed of 0.06 deg/min. $N_2$ adsorption-desorption isotherms at 77 K were performed with a Quantachrome Autosorb1-C system, the data were analyzed by employing the BJH (Barrett-Joyner-Halenda) method. Pore volume and pore size distribution curves were obtained from the desorption branch of the isotherm. High Resolution TEM (HRTEM) images were obtained with a JEOL 200CX electron microscope operating at 200 kV.

The results of these analyses are shown in Table 1.

TABLE 1

| Characterization of different supports | | | |
|---|---|---|---|
| BET $m^2/g$ | BJH (Ads.) $m^2/g$ | Pore Volume $cm^3/g$ | Pore Size* Nm |
| $Al_2O_3$ 166 | 198 | 0.86 | 2.9 |
| MgO 199 | 208 | 0.19 | 1.5 |
| SBA-15 893 | 861 | 1.37 | 6.6 |

*average pose size as determined by nitrogen physisorption
Note:
generally, the surface area of $Al_2O_3$ and Mgo aerogels can be influenced by the manner in which the water is introduced during aerogel preparation, e.g. dropwise or at once.

Application of POMs on the Support

Example 6

Impregnation upon MgO and $Al_2O_3$ Aerogels g of a polyoxometalate salt prepared according to Examples 1 or 2 was dissolved in 200 mL of water. 0.5 g of MgO or $Al_2O_3$ was added and the mixture was stirred at 80° C. to dryness.

In case tetrabutylammonium type POM salts have to be supported, the polyoxometalate salt was dissolved in acetonitrile instead of water.

Example 7

Modification of SBA-15 and POM Supporting

The surface modification of SBA-15 and subsequent POM supporting is shown in the following scheme:

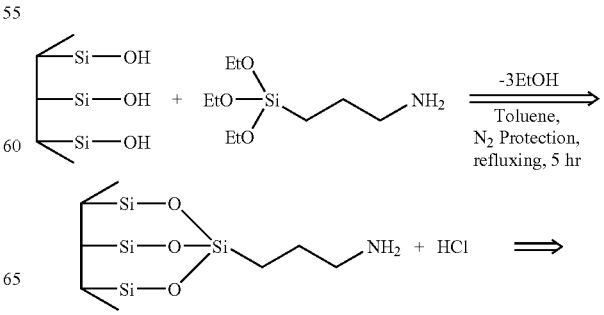

-continued

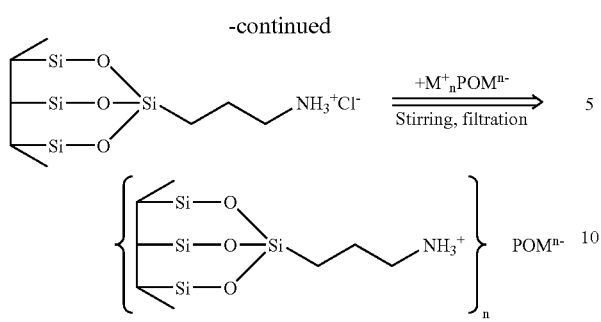

In a Schlenk tube, 1 g of mesoporous silica SBA-15 prepared according to Example 5 was heated to 130° C. for 5 h in vacuum to remove the adsorbed water. Then, under nitrogen atmosphere 30 mL of a 1 wt. % solution of 3-aminopropyltriethoxysilane in toluene was added to the silica. After stirring and refluxing for 5 h, the solids were filtered and washed with toluene to remove unanchored 3-aminopropyltriethoxysilane. The solids were collected and heated in an oven at 100° C. for 5 h for the isomerization process to obtain the amino group modified mesoporous silica. To support POMs thereon, 0.5 g of the modified silica was mixed with 100 ml of water, and HCl (2 M) was added to adjust the pH to about 2. Then, 0.4 g of a polyoxometalate prepared according to Example 1 or 2 was added and the mixture was stirred for 8 h. The solids were filtered and washed with water three times. The product was kept in an oven at 100° C.

The same modification and supporting procedure applies to $SiO_2$.

The supported polyoxometalates prepared according to Examples 6 and 7 were characterized by ICP analysis using a Varian Vista MPX. The samples were prepared using microwave digestion by dissolving 10 mg of the supported POM in a mixture of $HNO_3$ (6 ml), HCl (6 ml), HF (1 ml) and $H_2O_2$ (3 ml). After the first run, 6 ml of boric acid (5%) was added and a second run was performed. The quantification was done by ICP-OES using calibration curves made between 0 and 50 ppm from standards with known amounts of the respective elements. All tests were conducted twice using a 20 mg sample in the second test. The final volume for each sample was 100 ml.

It can be seen from Table 2 that the catalysts according to the invention typically have POM loading levels between about 8 and 33% by weight. The application of POMs on SBA-15 modified with aminopropyltriethoxysilane appears to give the highest POM loadings.

Catalytic Oxidation of Alkanes

Example 8

Oxidation of Hexadecane 10 mg of the catalyst (either non-supported POM according to Examples 1 or 2 or supported POM according to Examples 6 or 7) and 5 ml of n-hexadecane were heated in a 25 ml 2-necked-round bottom flask to 150° C. at constant air flow for 6 h. The solution was allowed to cool to ambient temperature and samples were taken for gas chromatographic analysis and stored under inert gas (argon).

Gas chromatographic analyses were carried out on a Varian GC 3900-FID using a flame-ionization detector, a HP-FFAP (J&W) column (l=50 m, ID=0.25 mm, film thickness: 0.5 µm), a pressure of 11 psi (0.76 bar) and a make up flow of 20 ml/min (T=60° C., 10° C./min to 219° C., hold t=52 min).

The conversion of the hexadecane feed with the tested catalysts is shown in Table 3 in terms of % by area of the hexadecane peak determined by gas chromatographic analysis.

TABLE 3

Conversion of n-hexadecane

| Polyoxometalate | Support | Conversion of hexadecane [%] |
|---|---|---|
| As2W18Cr4 | none | 16.94 |
| As2W18Cr4 | SBA-15 | 22.75 |
| As2W18Cr4 | MgO | 14.02 |
| As2W18Fe4 | none | 4.12 |
| As2W18Fe4 | $SiO_2$ | 18.03 |
| As2W18Fe4 | $Al_2O_3$ | 8.21 |
| As2W18Fe4 | SBA-15 | 15.08 |
| As2W18Fe4 | MgO | 17.03 |
| Sb2W18Co4 | SBA-15 | 19.85 |
| Sb2W18Cr4 | none | 17.88 |
| Sb2W18Cr4 | $SiO_2$ | 13.40 |
| Sb2W18Cr4 | MgO | 18.73 |
| Sb2W18Cr4 | SBA-15 | 22.81 |
| Sb2W18Fe4 | none | 19.11 |

TABLE 2

Distribution of elements of supported POMs (% by weight)

| | % W | % Cr | % Si | % Fe | % Mg | % Co | % Al | % Sb | % Se | % Te |
|---|---|---|---|---|---|---|---|---|---|---|
| Sb2W18Cr4/SBA-15 | 6.43 | 0.31 | 27.79 | | | | | 0.60 | | |
| Sb2W18Fe4/SiO2 | 7.14 | | 36.88 | 0.32 | | | | 0.26 | | |
| Sb2W18Fe4/SBA-15 | 7.02 | | 35.15 | 0.27 | | | | 0.13 | | |
| Sb2W18Fe4/MgO | 5.37 | | | 0.12 | 36.14 | | | 1.10! | | |
| Sb2W18Co4/MgO | 5.86 | | | | 36.36 | * | | 1.18! | | |
| SeW18Co4/SiO2 | 0.16 | | 32.53 | | | * | | | 0.16! | |
| SeW18Co4/SBA-15 | 18.45 | | 27.74 | | | 0.040 | | | 1.75! | |
| Se2W18Cr4/MgO | 9.49 | 0.017 | | | 31.80 | | | | 0.53! | |
| Se2W18Cr4/Al2O3 | 5.63 | 0.23 | | | | | 34.85 | | 0.33! | |
| Te2W18Co4/MgO | 8.36 | | | | 36.16 | 0.088 | | | | 0.73 |
| Se2W18Cr4/SBA-15 | 7.76 | 0.087 | 33.41 | | | | | | 0.28! | |
| Sb2W18Co4/SiO2 | 7.34 | | 37.17 | | | 0.002 | | 0.16! | | |
| Te2W18Co4/SBA-15 | 21.42 | | 25.75 | | | 0.088 | | | | 1.41 |

* = signal of sample < signal of blank
! = due to the final dilution factor of 10000, a small difference in signal intensity can lead to a different result TABLE 3-continued Conversion of n-hexadecane

| Polyoxometalate | Support | Conversion of hexadecane [%] |
|---|---|---|
| Sb2W18Fe4 | SiO$_2$ | 5.85 |
| Sb2W18Fe4 | SBA-15 | 13.39 |
| Sb2W18Fe4 | MgO | 12.02 |
| Se2W18Co4 | none | 14.11 |
| Se2W18Co4 | SiO$_2$ | 6.69 |
| Se2W18Co4 | Al$_2$O$_3$ | 19.35 |
| Se2W18Co4 | SBA-15 | 17.75 |
| Se2W18Co4 | MgO | 18.14 |
| Se2W18Cr4 | none | 18.74 |
| Se2W18Cr4 | SBA-15 | 15.4 |
| Se2W18Cr4 | Al$_2$O$_3$ | 20.87 |
| Se2W18Cr4 | MgO | 18.36 |
| Se2W18Fe4 | none | 3.05 |
| Se2W18Fe4 | SiO$_2$ | 19.01 |
| Se2W18Fe4 | Al$_2$O$_3$ | 18.60 |
| Se2W18Fe4 | SBA-15 | 16.84 |
| Se2W18Fe4 | MgO | 6.09 |
| Te2W18Co4 | none | 15.47 |
| Te2W18Co4 | SBA-15 | 10.85 |
| Te2W18Cr4 | Al$_2$O$_3$ | 12.06 |
| Te2W18Cr4 | none | 18.65 |
| Te2W18Cr4 | SBA-15 | 25.48 |
| Te2W18Fe4 | SiO$_2$ | 10.68 |
| Te2W18Fe4 | Al$_2$O$_3$ | 6.45 |
| Te2W18Fe4 | SBA-15 | 15.36 |
| Te2W18Fe4 | MgO | 14.57 |

The results of Table 3 show that the supported polyoxometalates of the invention lead to a similar or better conversion of the alkane feed than the corresponding non-supported POMs. However, taking into account the POM loadings of the heterogeneous catalysts, the conversion of hexadecane, i.e. the catalytic activity of the POM, is increased by a factor of about 2 to about 10 by supporting the polyoxometalates.

Furthermore, the product distribution was determined by gas chromatographic analysis. For example, the composition of the product prepared by a supported polyoxometalate according to the invention was as follows:

n-hexadecane: about 75.0%, $C_{10}$-$C_{16}$ ketones: about 12.2%, $C_{16}$ alcohols: about 3.5%, $C_6$-$C_{13}$ acids: about 2.7%, and gamma-lactones: about 1.2%.

Catalysts according to the invention were mainly selective to $C_{10}$-$C_{16}$ ketones and in particular $C_{16}$ ketones. Some combustion of hydrocarbon took place as evidenced by the formation of lower carbon chain carboxylic acids.

The other compounds of the product mixture were found to be mainly aldehydes, paraffins, and ketones having less then 10 carbon atoms.

All documents described herein are incorporated by reference herein, including any priority documents and/or testing procedures, except to the extent they are inconsistent with this specification. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. Supported polyoxometalates represented by the formula $$(A_n)^{m+}[M_4(H_2O)_{10}(XW_9O_{33})_2]^{m-}$$

or solvates thereof, wherein

A represents a cation, n is the number of cations, m is the charge of the polyoxoanion, M is a transition metal, and X is an element selected from the group consisting of As, Sb, Bi, Se and Te, wherein the polyoxometalate is supported on a solid support selected from the group consisting of Al$_2$O$_3$, MgO, TiO$_2$, ZrO$_2$, SiO$_2$, mesoporous silica, active carbon, diatomite, clays, zeolites, polyoxometalate salts and mixtures thereof, with the proviso that the polyoxometalate salt supports are different from the supported polyoxometalates defined by the above formula.

2. The Polyoxometalates of claim 1, wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof.

3. The Polyoxometalates of claim 1, wherein M is selected from Fe, Cr, Mn, Co, Ni, Cu, Zn, Cd and Hg.

4. The Polyoxometalates of claim 2, wherein M is selected from Fe, Cr, Mn, Co, Ni, Cu, Zn, Cd and Hg.

5. The Polyoxometalates of claim 1 wherein the mesoporous silica is SBA-15, MCM-41 or MCM-48.

6. The Polyoxometalates of claim 2 wherein the mesoporous silica is SBA-15, MCM-41 or MCM-48.

7. The Polyoxometalates of claim 3 wherein the mesoporous silica is SBA-15, MCM-41 or MCM-48.

8. The Polyoxometalates of claim 4 wherein the mesoporous silica is SBA-15, MCM-41 or MCM-48.

9. The Polyoxometalates of claim 1, wherein the solid support is SiO$_2$ or mesoporous silica.

10. The Polyoxometalates of claim 2, wherein the solid support is SiO$_2$ or mesoporous silica.

11. The Polyoxometalates of claim 3, wherein the solid support is SiO$_2$ or mesoporous silica.

12. The Polyoxometalates of claim 4, wherein the solid support is SiO$_2$ or mesoporous silica.

13. Supported polyoxometalates represented by the formula $$(A_n)^{m+}[M_4(H_2O)_{10}(XW_9O_{33})_2]^{m-}$$

or solvates thereof, wherein

A represents a cation, n is the number of cation, m is the charge of the polyoxoanion, M is a transition metal, and X is an element selected from the group consisting of As, Sb, Bi, Se, and Te, wherein the polyoxometalate is supported on a solid support, and the solid support is SBA-15, having a surface modified with an amine compound of formula $$(R^1O)_3Y(CH_2)_xNR^2{}_2,$$

wherein $R^1$ is alkyl,

Y is carbon or silicon, x is 0, 1, 2, 3, 4, 5, 6, 7, 8, 9, 10, 11, or 12, and $R^2$ is hydrogen, alkyl or aryl.

14. The Polyoxometalates of claim 13 wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof 15. The Polyoxometalates of claim 13 wherein M is selected from Fe, Cr, Mn, Co, Ni, Cu, Zn, Cd and Hg.

16. The Polyoxometalates of claim 14 wherein M is selected from Fe, Cr, Mn, Co, Ni, Cu, Zn, Cd and Hg.

17. The Polyoxometalates of claim 13, wherein the solid support is SBA-15, having a surface modified with aminopropyltriethoxysilane.

18. The Polyoxometalates of claim 14, wherein the solid support is SBA-15, having a surface modified with aminopropyltriethoxysilane.

19. The Polyoxometalates of claim 15, wherein the solid support is SBA-15, having a surface modified with aminopropyltriethoxysilane.

20. The Polyoxometalates of claim 16, wherein the solid support is SBA-15, having a surface modified with aminopropyltriethoxysilane.

21. Supported polyoxometalates represented by the formula $$(A_n)^{m+}[M_4(H_2O)_{10}(XW_9O_{33})_2]^{m-}$$

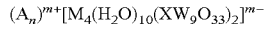

or solvates thereof, wherein
A represents a cation,
n is the number of cations,
m is the charge of the polyoxoanion,
M is a transition metal, and
X is an element selected from the group consisting of As, Sb, and Bi,
wherein the polvoxometalate is supported on a solid support selected from the group consisting of $Al_2O_3$, MgO, $TiO_2$, $SiO_2$, mesoporous silica, active carbon, diatomite, clays, zeolites, polyoxometalate salts and mixtures thereof, with the proviso that the polyoxometalate salt supports are different from the supported polyoxometalates defined by the above formula.

22. Supported polyoxometalates represented by the formula $$(A_n)^{m+}[M_4(H_2O)_{10}(XW_9O_{33})_2]^{m-}$$

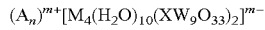

or solvates thereof, wherein
A represents a cation,
n is the number of cations,
m is the charge of the polyoxoanion,
M is a transition metal, and
X is an element selected from the group consisting of Se and Te,
wherein the polyoxometalate is supported on a solid support selected from the group consisting of $Al_2O_3$, MgO, $TiO_2$, $SiO_2$, mesoporous silica, active carbon, diatomite, clays, zeolites, polyoxometalate salts and mixtures thereof, with the proviso that the polyoxometalate salt supports are different from the supported polyoxometalates defined by the above formula.

23. A process for the preparation of supported polyoxometalates represented by the formula (A):

$$(A_n)^{m+}[M_4(H_2O)_{10}(XW_9O_{33})_2]^{m-}$$

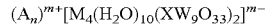

or solvates thereof, wherein
A represents a cation,
n is the number of cations,
m is the charge of the polyoxoanion,
M is a transition metal, and
X is an element selected from the group consisting of As, Sb, Bi, Se and Te, said process comprising
(a) mixing a solid support selected from the group consisting of $Al_2O_3$, MgO, $TiO_2$, $ZrO_2$, $SiO_2$, mesoporous silica, active carbon, diatomite, clays, zeolites, polyoxometalate salts and mixtures thereof, with a solution of $(A_n)^{m+}[M_4(H_2O)_{10}(XW_9O_{33})_2]^{m-}$,
(b) stirring and optionally heating the mixture of step (a),
(c) optionally filtering the mixture of step (b), and
(d) recovering the supported polyoxometalate;
provided that the solid supports are different from the supported polyoxometalates defined by the above formula (A).

24. The process of claim 23, wherein the solvent used for the solution in step (a) is selected from the group consisting of water, acetonitrile, acetone, dimethylformamide, 1,4-dioxane, 1,2-dichloroethane and combinations thereof.

25. The process of claim 23, wherein in step (b) the mixture is heated to a temperature of 50 to 100° C.

26. The process of claim 24, wherein in step (b) the mixture is heated to a temperature of 50 to 100° C.

27. The process of claim 23 wherein in step (d) the supported polyoxometalate is recovered by evaporating the solvent of the mixture of step (b) or washing and drying the filtered solid of step (c).

28. The process of claim 24 wherein in step (d) the supported polyoxometalate is recovered by evaporating the solvent of the mixture of step (b) or washing and drying the filtered solid of step (c).

29. The process of claim 25 wherein in step (d) the supported polyoxometalate is recovered by evaporating the solvent of the mixture of step (b) or washing and drying the filtered solid of step (c).

30. A process to oxidize organic substrates comprising contacting an organic substrate with the Polyoxometalates of claim 1.

31. A process to oxidize organic substrates comprising contacting an organic substrate with the Polyoxometalates of claim 1 in the presence of an oxidizing agent.

32. The process of claim 30 wherein the organic substrate is an alkane.

33. The process of claim 31 wherein the organic substrate is an alkane.

* * * * *